United States Patent
Kim et al.

(10) Patent No.: US 11,569,507 B2
(45) Date of Patent: Jan. 31, 2023

(54) ANODE COMPRISING CELLULOSE-BASED COMPOUND FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Yuhyun Kim, Yongin-si (KR); Myungseop Kim, Yongin-si (KR); Jungmin Lee, Yongin-si (KR); Ilkyong Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 343 days.

(21) Appl. No.: 16/762,354

(22) PCT Filed: Sep. 10, 2018

(86) PCT No.: PCT/KR2018/010546
§ 371 (c)(1),
(2) Date: May 7, 2020

(87) PCT Pub. No.: WO2019/093644
PCT Pub. Date: May 16, 2019

(65) Prior Publication Data
US 2020/0274163 A1    Aug. 27, 2020

(30) Foreign Application Priority Data

Nov. 7, 2017  (KR) .................. 10-2017-0147448
Jul. 10, 2018  (KR) .................. 10-2018-0080155

(51) Int. Cl.
*H01M 4/62*    (2006.01)
*H01M 10/0525*    (2010.01)
*H01M 4/02*    (2006.01)

(52) U.S. Cl.
CPC ......... *H01M 4/62* (2013.01); *H01M 10/0525* (2013.01); *H01M 2004/027* (2013.01)

(58) Field of Classification Search
CPC ............... H01M 4/62; H01M 10/0525; H01M 2004/027; H01M 4/13; H01M 10/052; H01M 4/622; Y02E 60/10
(Continued)

(56) References Cited

U.S. PATENT DOCUMENTS

2011/0303881 A1    12/2011  Bae et al.
2015/0030923 A1    1/2015   Koo et al.
(Continued)

FOREIGN PATENT DOCUMENTS

JP    2011-256358 A    12/2011
KR    10-2013-0094738 A    8/2013
(Continued)

OTHER PUBLICATIONS

Korean Notice of Allowance dated Mar. 16, 2021, issued in corresponding Korean Patent Application No. 10-2018-0080155 (8 pages).

*Primary Examiner* — Gary D Harris
(74) *Attorney, Agent, or Firm* — Lewis Roca Rothgerber Christie LLP

(57) ABSTRACT

The present invention relates to an anode for lithium secondary battery and a lithium secondary battery comprising the same, the anode for lithium secondary battery comprising a current collector; and an anode active material layer which is formed on one surface of the current collector, and comprises an anode active material and a cellulose-based compound which has a weight-average molecular weight (Mw) of 500,000 g/mol to 700,000 g/mol and a substitution degree of 0.9 to 1.0, wherein the anode for lithium secondary battery has a loading level (L/L) of 13 mg/cm² or greater.

7 Claims, 6 Drawing Sheets

(58) Field of Classification Search
USPC .......................................................... 429/215
See application file for complete search history.

(56) References Cited

U.S. PATENT DOCUMENTS

2015/0340697 A1    11/2015  Jang et al.
2018/0006300 A1*   1/2018   Jeong ................... H01M 4/587

FOREIGN PATENT DOCUMENTS

| KR | 10-2014-0095804 A | 8/2014 |
| KR | 10-2015-0071451 A | 6/2015 |
| KR | 10-2015-0134735 A | 12/2015 |
| KR | 10-2016-0073822 A | 6/2016 |
| KR | 10-2016-0112748 A | 9/2016 |
| KR | 10-2017-0111748 A | 10/2017 |

* cited by examiner

ANODE COMPRISING CELLULOSE-BASED COMPOUND FOR LITHIUM SECONDARY BATTERY AND LITHIUM SECONDARY BATTERY COMPRISING SAME

CROSS-REFERENCE TO RELATED APPLICATION(S)

This application is a National Phase Patent Application of International Patent Application Number PCT/KR2018/010546, filed on Sep. 10, 2018, which claims priority of Korean Patent Application No. 10-2017-0147448, filed Nov. 7, 2017 and Korean Patent Application No. 10-2018-0080155, filed Jul. 10, 2018. The entire contents of all of which are incorporated herein by reference.

TECHNICAL FIELD

This relates to a negative electrode for a lithium secondary battery and a lithium secondary battery including the same.

BACKGROUND ART

A lithium secondary battery has recently drawn attention as a power source for small portable electronic devices, and the lithium secondary battery uses an organic electrolyte solution and thereby, has twice or more as high a discharge voltage as a conventional battery using an alkali aqueous solution and accordingly, has high energy density.

As for a positive electrode active material of a lithium secondary battery, a lithium-transition metal oxide having a structure capable of intercalating/deintercalating lithium ions, such as $LiCoO_2$, $LiMn_2O_4$, $LiNi_{1-x}Co_xO_2$ (0<x<1), and the like has been mainly used.

As for negative electrode active materials, various carbon-based materials capable of intercalating/deintercalating lithium ions such as artificial graphite, natural graphite, and hard carbon have been used, and recently, a non-carbon-based negative electrode active material such as a silicon-based or tin-based material has been researched in order to obtain high capacity.

In particular, as it is recently required to more increase capacity of the battery, the research for thickening the active material layer are actively has studied.

Technical Problem

One embodiment provides an anode for a rechargeable lithium battery exhibiting increased capacity and reduced resistance.

Another embodiment provides a lithium secondary battery including the negative electrode.

Technical Solution

One embodiment provides an anode for a lithium secondary battery including a current collector; and an anode active material layer which is formed on one surface of the current collector, and includes an anode active material and a cellulose-based compound which has a weight-average molecular (Mw) of 500,000 g/mol to 700,000 g/mol and a substitution degree of 0.9 to 1.0, wherein a loading level (L/L) is 13 mg/cm² or greater.

An amount of the cellulose-based compound may be 1 wt % or less based on the total weight of the negative active material layer, and in one embodiment, may be 0.6 wt % to 1 wt %.

The anode may have a loading level of 13 mg/cm² to 15 mg/cm².

The cellulose-based compound may be methyl cellulose, ethyl cellulose, carboxymethyl cellulose, carboxyethyl cellulose, hydroxyethyl cellulose, benzyl cellulose, triethyl cellulose, cyanoethyl cellulose, aminoethyl cellulose, nitro cellulose, cellulose ether, an alkali salt thereof, or a combination thereof.

The anode active material layer may further include a water-soluble binder.

Another embodiment provides a lithium secondary battery including an anode, a cathode, and an electrolyte.

The exemplary matters of other embodiments of the present invention are included in the following detailed description.

Advantageous Effects

The anode for a lithium secondary battery may exhibit high capacity and low resistance, so that it may provide a lithium secondary battery with high capacity and excellent battery performance.

MODE FOR INVENTION

Figure 1:
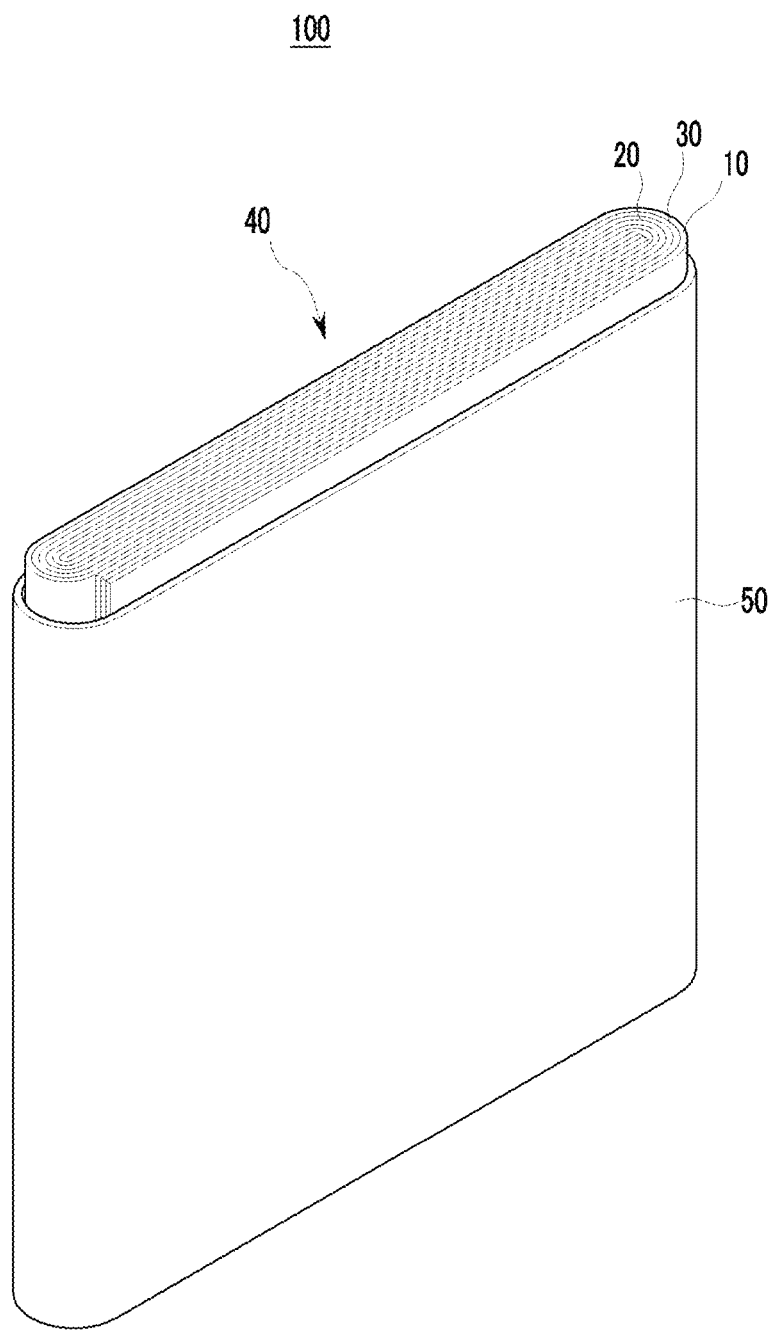
FIG. 1 is a drawing schematically showing a structure of the lithium secondary battery according to one embodiment.

Hereinafter, embodiments of the present invention are described in detail. However, these embodiments are exemplary, the present invention is not limited thereto, and the present invention is defined by the scope of claims.

The anode for the lithium secondary battery may include a current collector; and an anode active material layer formed on one surface of the current collector and including an anode active material, and a cellulose-based compound.

The cellulose-based compound may have a weight-average molecular weight (Mw) of 500,000 g/mol to 700,000 g/mol. When the weight-average molecular weight (Mw) of the cellulose-based compound is within the range, crack occurrence during a drying step of a thick preparation of an anode active material layer may be suppressed, thereby improving the cycle-life characteristics and inhibiting an increase in thickness.

Generally, when an anode active material layer is thickly prepared in order to increase capacity, a crack in the anode active material layer may occur during the drying of the electrode preparation, so that it is difficult to thickly prepare the active material layer. Whereas, in one embodiment, as the cellulose-based compound having the above range of high molecular weight is used in the anode active material layer, the anode active material layer may be thickly formed, thereby fabricating an anode having high capacity and improving the low-temperature characteristics.

When the weight-average molecular weight of the cellulose-based compound is less than 500,000 g/mol, it is not desirable because a crack may occur, and when that is more than 700,000 g/mol, the viscosity is extremely increased to decrease the solubility and to deteriorate the stability of the active material layer composition, so that it is not desirable for good preparation of an active material layer.

A degree of substitution (DS) of the cellulose-based compound may be 0.9 to 1.0. The degree of substitution of the cellulose-based compound refers to an average number of substitution groups which are groups that are substituted to cellulose per repeating unit of the cellulose, and for example, the carboxymethyl cellulose may have 3 or less of carboxymethyl groups per repeating unit of cellulose.

When the degree of substitution of the cellulose-based compound is 0.9 to 1.0, it may have advantages such as good solubility and adhesion strength, compared to that of less or more than the above range. When the degree of substitution of the cellulose-based compound is less than 0.9, the solubility of the cellulose-based compound may be deteriorated, and when that is more than 1.0, the adhesion strength to the current collector may be significantly deteriorated.

The cellulose-based compound may be methyl cellulose, ethyl cellulose, carboxymethyl cellulose, carboxyethyl cellulose, hydroxyethyl cellulose, benzyl cellulose, triethyl cellulose, cyanoethyl cellulose, am inoethyl cellulose, nitro cellulose, cellulose ether, an alkali salt thereof, or a combination thereof.

In one embodiment, a loading level (L/L) of the anode may be 13 mg/cm$^2$ or more, and in another embodiment, 13 mg/cm$^2$ to 15 mg/cm$^2$. As such, when the anode according to one embodiment has a loading level of 13 mg/cm$^2$ or more, that is, the anode has a high loading level, it exhibits high capacity. When the cellulose-based compound having the weight-average molecular weight (Mw) and the degree of substitution within the above ranges is used in the anode having the loading level of 13 mg/cm$^2$ or more, it may effectively inhibit the crack occurrence which severely occurs during the coating step, and it may improve the cycle-life characteristics. As the crack insignificantly occurs in the anode having the loading level of less than 13 mg/cm$^2$, the effects of using the cellulose-based compound having the weight-average molecular weight (Mw) and the degree of substitution may be rarely obtained or the use may increase the crack occurrence.

In the anode active material layer, the amount of the cellulose-based compound may be 1 wt % or less based on the total weight of the negative active material layer, or 0.6 wt % to 1 wt %. When the amount of the cellulose-based compound is within the range, it is desirable since the resistance of the electrode may be decreased.

As described above, when the cellulose-based compound having the weight-average-molecular weight and the degree of substitution within the above range is used in the anode, the stability of the active material slurry used in the electrode preparation and rheology behavior are excellent, so that it allows use of the cellulose-based compound in the small amount of 1 wt % or less based on the total weight of 100 wt % of the anode active material layer, thereby exhibiting a better effect of decreasing the resistance of the electrode.

The anode active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include for example, a carbon material that is a generally-used carbon-based negative active material in a lithium secondary battery. Examples of the carbon-based negative active material may be crystalline carbon, amorphous carbon, or a mixture thereof. The crystalline carbon may have an unspecified shaped, or may be sheet, flake, spherical, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, or Sn.

The material capable of doping/dedoping lithium ions may be Si, SiO$_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, or a combination thereof, but is not Si), a Si-carbon composite, Sn, SnO$_2$, a Sn—R alloy (wherein R is an element selected from an alkali metal, an alkaline-earth metal, a Group 13 element, a Group 14 element, a Group 15 element, a Group 16 element, a transition metal, a rare earth element, or a combination thereof, but is not Sn), a Sn-carbon composite, and the like, and at least one of these materials may be mixed with SiO$_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The Si-based active materialmay be Si, SiO$_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, or a combination thereof, but not Si), a Si-carbon composite, Sn, SnO$_2$, a Sn—R alloy (wherein R is an element selected from an alkali metal, an alkaline-earth metal, a Group 13 element, a Group 14 element, a Group 15 element, a Group 16 element, a transition metal, a rare earth element, or a combination thereof, but is not Sn), a Sn-carbon composite, and the like and at least one of these materials may be mixed with SiO$_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The transition metal oxide includes a lithium titanium oxide.

According to an embodiment, the anode active material may be a Si-carbon composite and the Si-carbon composite may include silicon particles and crystalline carbon. An average particle diameter (D50) of the silicon particles may be 10 nm to 200 nm. The Si—C composite may further include an amorphous carbon layer formed at at least a portion thereof. In the present specification, unless otherwise defined, an average particle diameter (D50) indicates a particle where a cumulative volume is 50 volume % in a particle distribution.

According to another embodiment, the anode active material may be used by mixing two or more anode active materials, and for example, may include a Si-carbon composite as the first anode active material and crystalline carbon as the anode negative active material. In the case of mixing two or more anode active materials as anode active materials, the mixing ratio thereof may be appropriately controlled, but a Si content may be adjusted to be 3 wt % to 50 wt % based on a total weight of the anode active material.

The anode active material layer may further include a water-soluble binder. The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

The anode active material layer may further include a conductive material. The conductive material is included to provide electrode conductivity, and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

In the anode active material layer, the amount of the cellulose-based compound may be 1 wt % or less, or 0.6 wt % to 1 wt % based on the total weight 100 wt % of the cellulose-based compound, and the amount of the anode active material may be 99 wt % or more based on the total weight 100 wt % of the anode active material layer, or 99.4 wt % to 99 wt %.

Furthermore, when the anode active material layer further includes the water-soluble binder, the amount of the anode active material may be 98 wt % to 97.5 wt %, and the amount of the water-soluble binder may be 1.0 wt % to 1.5 wt % based on the total weight of the anode active material layer. In addition, in case of further including the conductive material, the amount of the anode active material may be 96.5 wt % to 97.5 wt %, the amount of the water-soluble binder may be 1.0 wt % to 1.5 wt %, and the amount of the conductive material may be 0.5 wt % to 1.0 wt %. In case of further including the water-soluble binder and the conductive material, the amount of the cellulose-based compound may be maintained at an amount of 1 wt % or less, or 0.6 wt % to 1 wt %, based on the total weight 100 wt % of the anode active material layer.

The current collector may include one selected from a copper foil, a nickel foil, a stainless steel foil, a titanium foil, a nickel foam, a copper foam, a polymer substrate coated with a conductive metal, or a combination thereof.

Another embodiment provides a lithium secondary battery including the anode, a cathode including a cathode active material, and an electrolyte.

The cathode includes a current collector, and a cathode active material formed on the current collector and including a cathode active material.

The cathode active material may include a compound being capable of reversibly intercalating and deintercalating lithium (a lithiated intercalation compound). Specifically, it may include one or more composite oxides of a metal selected from cobalt, manganese, nickel, or a combination thereof, and lithium. More specific examples may be compounds represented by one of the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0 \le b \le 0.5$, $0 \le c \le 0.05$); $Li_aE_{2-b}X_bO_{4-c}D_c$ ($0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha < 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \le f \le 2$); $Li_{(3-f)}Fe_2PO_{43}$ ($0 \le f \le 2$); and $Li_aFePO_4$ ($0.90 \le a \le 1.8$)

In the chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

The compounds may also have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material (for example, any coating method such as spray coating, dipping, and the like) by using these elements in the compound, but is not illustrated in more detail since it is well-known in the related field.

According to one embodiment, the cathode active material may be at least two of nickel-based active materials such as $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \times 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$), or a mixture of the nickel-based cathode active material and another active material of the above cathode active material except for the nickel-based cathode active material.

In particular, the nickel-based cathode active material may desirably be $Li_aNi_{b1}Co_{c1}X_{d1}G_{z1}O_2$ ($0.90 \le a \le 1.8$, $0.5 \le b1 \le 0.98$, $0 < c1 \le 0.3$, $0 < d1 \le 0.3$, $0 \le z1 \le 0.1$, $b1+c1+d1+z1=1$, X is Mn, Al, or combination thereof, and G is Cr, Fe, Mg, La, Ce, Sr, V, or combination thereof).

If they are mixed to use, the mixing ratio may be suitably controlled according to the desired physical properties. For example, if the mixture of the nickel-based cathode active material with the other active material is used, the amount of the nickel-based cathode active material may be about 30 wt % to 97 wt % based on the total weight of the cathode active material.

In the cathode, an amount of the cathode active material may be 90 wt % to 98 wt % based on the total weight of the cathode active material layer.

In an embodiment of the present disclosure, the cathode active material layer may further include a binder and a conductive material. Herein, each amount of the binder and the conductive material may be about 1 wt % to about 5 wt %, respectively, based on a total amount of the cathode active material layer.

The binder improves binding properties of cathode active material particles with one another and with a current collector. Examples of the binder may be polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use an aluminum foil, a nickel foil, or a combination thereof, but is not limited thereto.

The cathode active material layer and the anode active material layer are formed by mixing an active material, a binder, and optionally a conductive material in a solvent to prepare an active material composition, and coating the active material composition on a current collector. The electrode preparation method is well known, and thus is not described in detail in the present specification. The solvent includes N-methyl pyrrolidone and the like, but is not limited thereto. Furthermore, when the water-soluble binder is used in the anode active material layer, a solvent used for preparing the anode active material composition may be water.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methyl propionate, ethyl propionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, and the like. Furthermore, the ketone-based solvent includes cyclohexanone and the like. In addition, the alcohol-based solvent include ethyl alcohol, isopropyl alcohol, and the like, and examples of the aprotic solvent includes nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance, and it may be well understood by one ordinary skilled in the related art.

Furthermore, the carbonate-based solvent is prepared by mixing a cyclic carbonate and a chain carbonate. When the cyclic carbonate and chain carbonate are mixed together in a volume ratio of 1:1 to 1:9, electrolyte performance may be improved.

When the non-aqueous organic solvents are used in a mixture, a mixed solvent of a cyclic carbonate and a chain carbonate; a mixed solvent of a cyclic carbonate and a propionate-based solvent; or a mixed solvent of a cyclic carbonate, a chain carbonate, and a propionate-based solvent may be used. The propionate-based solvent may be methyl propionate, ethyl propionate, propyl propionate, or a combination thereof.

Furthermore, the cyclic carbonate and the chain carbonate, or the cyclic carbonate and the propionate-based solvent may be mixed in a volume ratio of about 1:1 to about 1:9 to exhibit good electrolyte performance. In addition, the cyclic carbonate, the chain carbonate and the propionate-based solvent may be mixed in a volume ratio of about 1:1:1 to about 3:3:4. Also, the mixing ratio of the solvents may be suitably controlled according to the desired physical properties.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

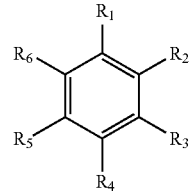

[Chemical Formula 1]

In Chemical Formula 1, $R_1$ to $R_6$ are the same or different and are selected from hydrogen, a halogen, a $C_1$ to $C_{10}$ alkyl group, a haloalkyl group, or a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate or an ethylene carbonate-based compound represented by Chemical Formula 2 as an additive for improving the cycle-life of a battery.

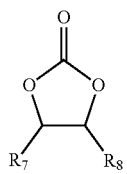

[Chemical Formula 2]

In Chemical Formula 2, $R_7$ and $R_8$ are the same or different and are selected from hydrogen, a halogen, a cyano group (CN), a nitro group ($NO_2$), and a fluorinated C1 to C5 alkyl group, provided that at least one of $R_7$ and $R_8$ is a halogen, a cyano group (CN), a nitro group ($NO_2$), and a fluorinated C1 to C5 alkyl group and both of $R_7$ and $R_8$ are not hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate range.

The electrolyte may further include vinylethylene carbonate, propane sultone, succinonitrile, or a combination thereof, and the amount thereof may be suitably controlled.

The lithium salt dissolved in the organic solvent supplies lithium ions in a battery, enables a basic operation of a rechargeable lithium battery, and improves transportation of the lithium ions between a cathode and an anode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI, or $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The lithium secondary battery may further include a separator between the cathode and the anode, depending on a type of the battery. Examples of a suitable separator material include polyethylene, polypropylene, polyvinylidene fluoride, and multi-layers thereof having two or more layers, and may be a mixed multilayer such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view showing a rechargeable lithium battery according to an embodiment. The rechargeable lithium battery according to an embodiment is illustrated as a prismatic battery, but is not limited thereto, and may include variously-shaped batteries such as a cylindrical battery, a pouch battery, and the like.

Referring to FIG. 1, a lithium secondary battery 100 according to an embodiment includes an electrode assembly 40 manufactured by winding a separator 30 disposed between a cathode 10 and an anode 20, and a case 50 housing the electrode assembly 40. An electrolyte (not shown) may be impregnated in the cathode 10, the anode 20, and the separator 30.

EXAMPLES

Hereinafter, examples of the present invention and comparative examples are described. These examples, however, are not in any sense to be interpreted as limiting the scope of the invention.

Example 1

97.7 wt % of an artificial graphite anode active material, 0.8 wt % of carboxymethyl cellulose with a weight-average molecular weight (Mw) of 500,000-700,000 g/mol and a degree of substitution of 0.9-1.0, and 1.5 wt % of a styrene-butadiene rubber binder were mixed in a water solvent to prepare an anode active material slurry.

The anode active material slurry was coated on a Cu current collector, dried, and compressed to produce an anode having a loading level of 13 mg/cm².

Comparative Example 1

97.7 wt % of an artificial graphite anode active material, 0.8 wt % of carboxymethyl cellulose with a weight-average molecular weight (Mw) of 300,000-500,000 g/mol and a degree of substitution of 0.7-0.8, and 1.5 wt % of a styrene-butadiene rubber binder were mixed in a water solvent to prepare an anode active material slurry.

The anode active material slurry was coated on a Cu current collector, dried, and compressed to produce an anode having a loading level of 13 mg/cm².

Comparative Example 2

An anode having a loading level of 13 mg/cm² was produced by the same procedure as in Comparative Example 1 except that the amount of the carboxymethyl cellulose with a weight-average molecular weight (Mw) of 300,000-500,000 g/mol and a degree of substitution of 0.7-0.8 was changed to 1.0 wt %.

Measurement of Slurry Stability

Figure 2:
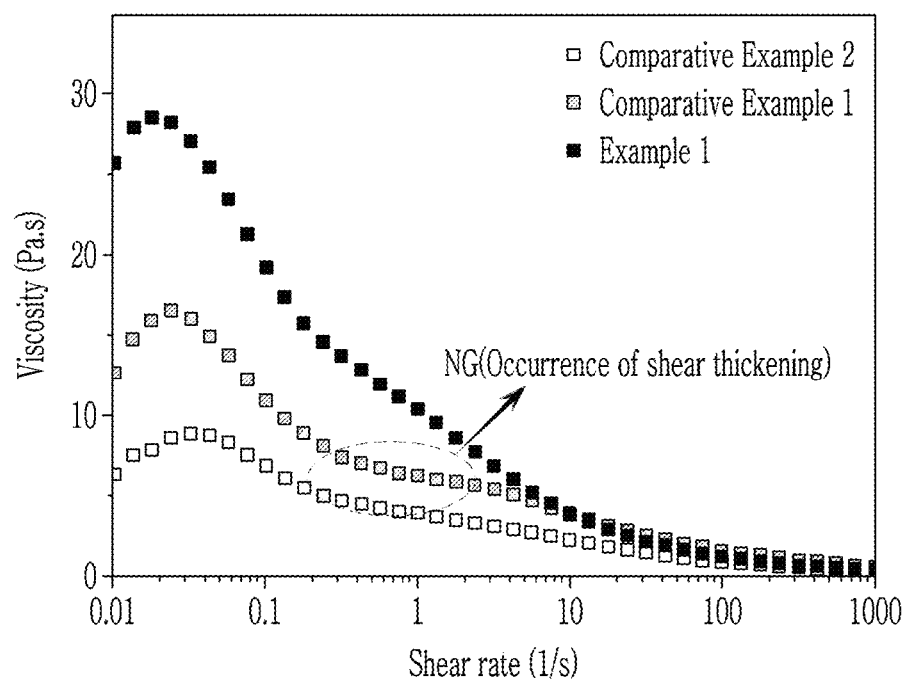
FIG. 2 is a graph showing the viscosity of the anode active material slurries according to Example 1 and Comparative Examples 1 and 2.

Viscosities of the cathode active material slurry according to Example 1 and Comparative Examples 1 and 2 were measured at a room temperature (25° C.) in the range of a shear rate of 0.01 s⁻¹ to 1000 s⁻¹, and the results are shown in FIG. 2. In FIG. 2, the shear rate is indicated as a log scale.

As shown in FIG. 2, the viscosity of the anode active material slurry according to Example 1 is higher than that of Comparative Examples 1 and 2, and when they are compared at a shear rate of near 1 s⁻¹, the viscosity of Example 1 was slowly reduced, the viscosities of Comparative Examples 1 and 2 exhibited as small parabolas that were slightly increased and then decreased. These results indicate that shear thickening occurred in Comparative Examples 1 and 2, and this was caused by deteriorating the stability of the slurry and unsatisfying the distribution. As from the results shown in FIG. 2, the stability of the anode active material slurry exhibits excellent safety.

Figure 3:
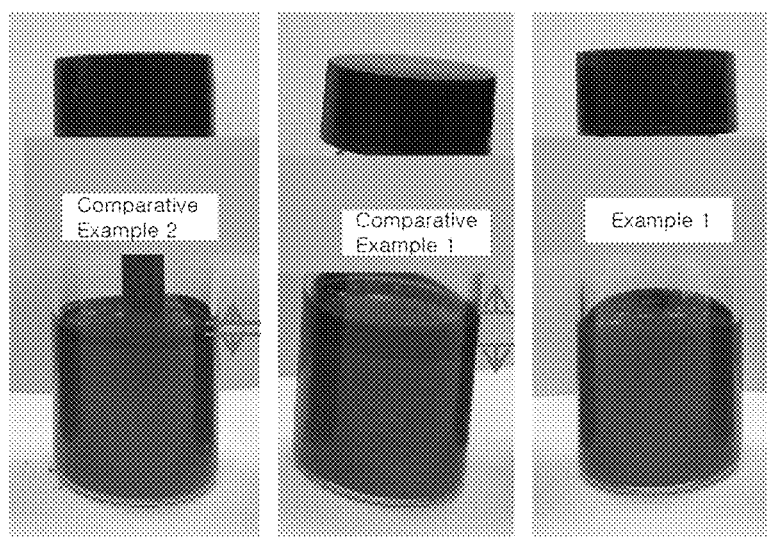
FIG. 3 is a photograph showing the stability of the anode active material slurries according to Example 1 and Comparative Examples 1 to 2.

Furthermore, after the anode active material slurry according to Example 1, and Comparative Examples 1 and 2 were allowed to stand at room temperature (25° C.) for one day, the preparation state was checked and the results are shown in FIG. 3. As shown in FIG. 3, the anode active material slurry of Example 1 had no layer separation, but those of Comparative Examples 1 and 2 had layer separation, and in particularly, in Comparative Example 1 using low-molecular weight carboxymethyl cellulose at 0.8 wt %, the layer separation severely occurred.

Measurement of Adhesion Strength, and Crack State

The adhesion strength of the anodes according to Example 1 and Comparative Examples 1 and 2 was measured. The adhesion strength was measured by using a universal testing machine and a method in which an anode active material layer on the Cu current collector was adhered to a polyvinyl chloride (PVC) double-faced tape and the anode active material layer was peeled from the current collector at 180° peel and a speed of 50 mm/min to evaluate the adhesion strength, and the results are shown in Table 1. Furthermore, whether cracks in the surface of the anode occurred or not was checked by coating the anode active material slurry on the current collector and evaluating the surface of the active material layer by eye, and the results are also shown in Table 1.

TABLE 1

| | Amount of the active material (wt %) | Adhesion strength (gf/mm) | State of crack |
|---|---|---|---|
| Comparative Example 2 | 97.5 | 1.0 | Δ |
| Comparative Example 1 | 97.7 | 0.92 | X |
| Example 1 | 97.7 | 1.1 | ○ |

Evaluation reference ○: crack occurrence and no separation during slitting
Δ: crack occurrence only early
X: crack occurrence As shown in Table 1, the anode of Example 1 exhibited high adhesion strength and no crack occurrence. Whereas, the anode of Comparative Example 1 exhibited low adhesion strength and crack occurrence, and the anode of Comparative Example 2 exhibited good adhesion strength, but crack occurrence, so that they were not suitable.

From the results shown in Table 1, it can be seen that although high molecular-weight carboxymethyl cellulose is used at an amount of 0.8 wt %, it gives the similar adhesion strength obtained from using low molecular-weight carboxymethyl cellulose at an amount of 1.0 wt %, and thus the amount of carboxymethyl cellulose may be decreased.

Measurement of Low Temperature Discharge Characteristics

Two half-cells were respectively fabricated using each of the anode according to Example 1 and Comparative Example 2, a lithium metal counter electrode, and an electrolyte solution. Herein, as an electrolyte solution, a mixed solvent of ethylene carbonate and diethyl carbonate (50:50 volume ratio) in which 1M $LiPF_6$ was dissolved was used.

Figure 4:
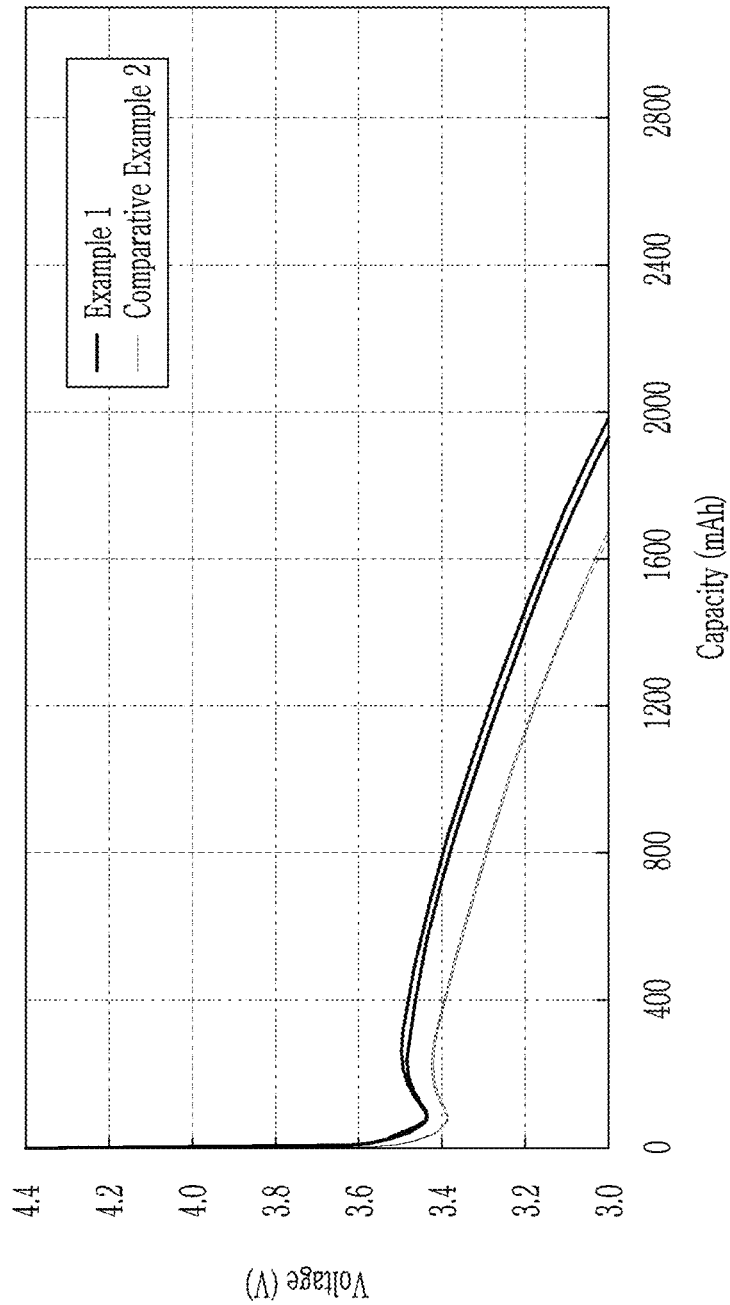
FIG. 4 is a graph showing the low-temperature discharge characteristics of the anode according to Example 1 and Comparative Example 2.

Two half-cells of Example 1 and two half-cells of Comparative Example 2 were charged once under a 0.2 C, 4.4 V, and 0.02 C cut-off condition and discharged once under a 0.5 C and 3.0 V cut-off condition at a low temperature (−15° C.), the discharge capacity was measured and the results are shown in FIG. 4.

As shown in FIG. 4, the discharge capacity of the cell including the anode of Example 1 was higher than that of the cell including the anode of Comparative Example 2, and it can be seen from the results that the cell including the anode of Example 1 exhibited excellent low-temperature discharge characteristics compared to Comparative Example 2.

Measurement of Room Temperature Capacity Retention and Thickness Increase Rate

Two half-cells were respectively fabricated using each of the anode according to Example 1 and Comparative Example 2, a lithium metal counter electrode, and an electrolyte solution. Herein, as the electrolyte solution, a mixed solvent of ethylene carbonate and diethyl carbonate (50:50 volume ratio) in which 1M $LiPF_6$ was dissolved was used.

The obtained half-cells was once underwent constant current-constant voltage charging under a 1.0 C, 4.4 V, and 0.1 C cut-off condition, then resting for 10 minutes, and once underwent constant current discharging under a 1.0 C and 3.0V cut-off condition, and then resting for 10 minutes, which made up 1 cycle, and were charged and discharged for 700 cycles. The discharge capacity according the charging and the discharging for 700 cycles were measured, the capacity retention was determined, and the results are shown in FIG. 5.

Figure 5:
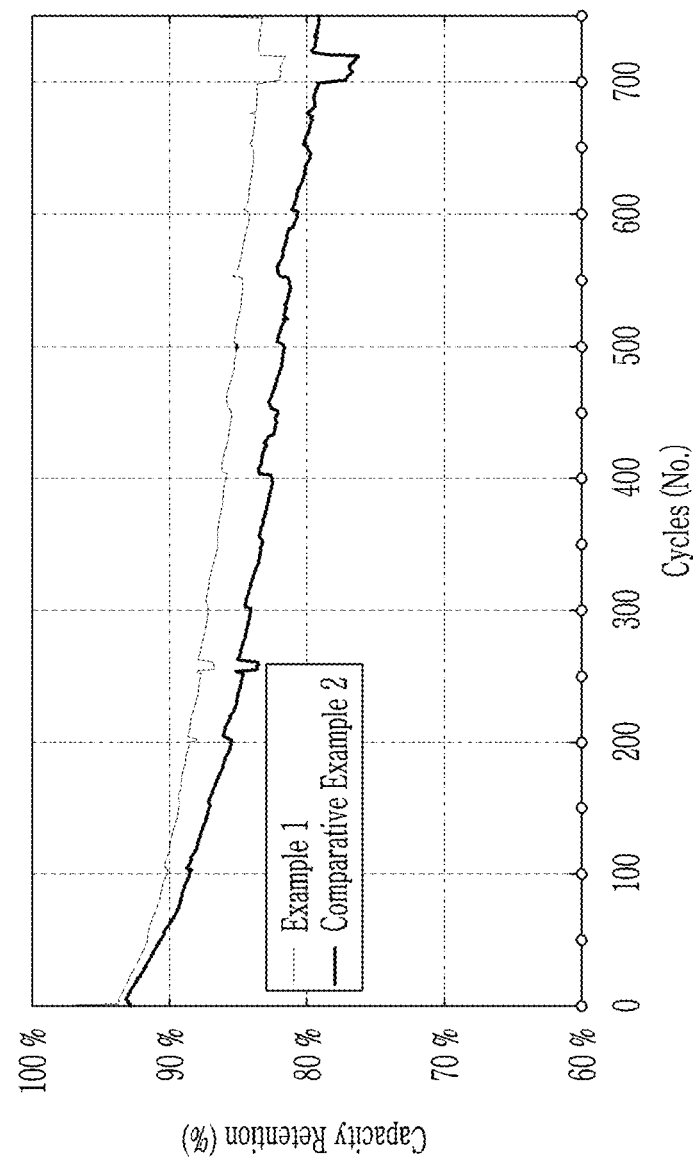
FIG. 5 is a graph showing the room-temperature of the anode according to Example 1 and Comparative Example 2.

As shown in FIG. 5, the room temperature capacity retention of the cell including the anode of Example 1 exhibited better than that of the cell including the anode of Comparative Example 2.

Figure 6:
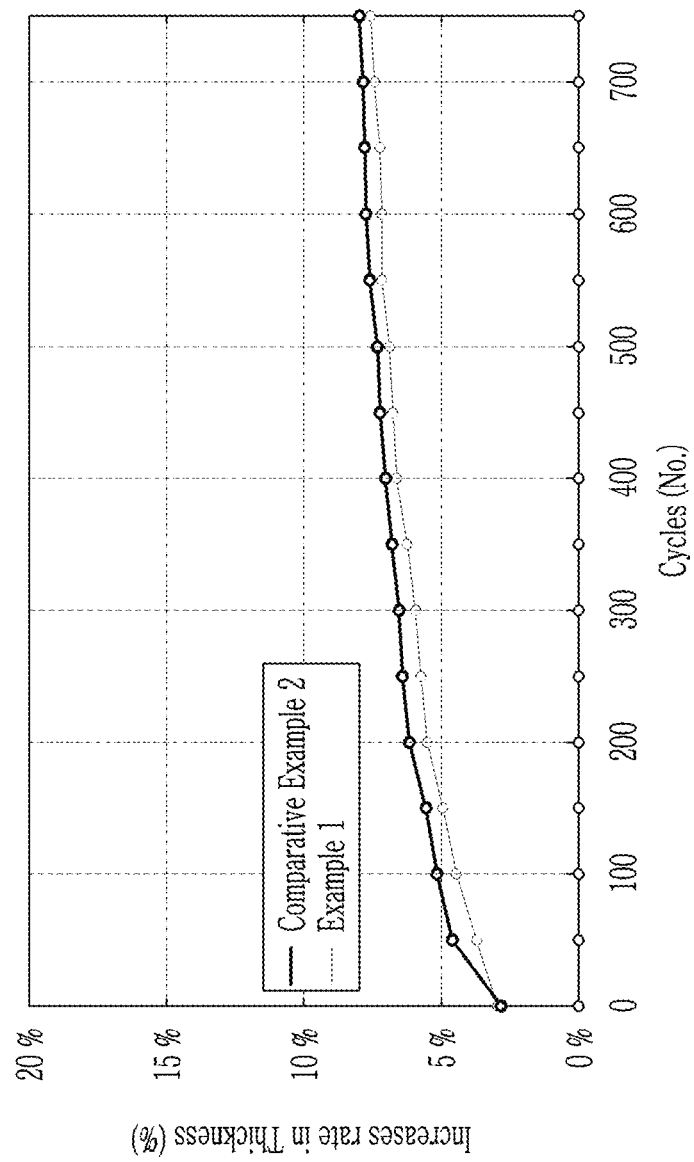
FIG. 6 is a graph showing an increase rate of thickness of the anode according to Example 1 and Comparative Example 2.

Furthermore, the thickness of the cells after the 700 cycles was measured, the thickness increase rate was obtained, and the results are shown in FIG. 6. As shown in FIG. 6, the thickness increase rate in the cell including the anode of Example 1 was lower than that of the cell including the anode of Comparative Example 2.

From the results in FIG. 5, and FIG. 6, it can be seen that the use of the anode according to Example 1 improves the capacity retention and the thickness increase rate.

Comparative Example 3

97.7 wt % of an artificial graphite anode active material, 0.8 wt % of carboxymethyl cellulose with a weight-average molecular weight (Mw) of 300,000-490,000 g/mol and a degree of substitution of 0.6-0.69, and 1.5 wt % of a styrene-butadiene rubber binder were mixed in a water solvent to prepare an anode active material slurry.

The anode active material slurry was coated on a Cu current collector, dried, and compressed to produce an anode having a loading level of 11 mg/cm².

Comparative Example 4

An anode having a loading level of 11 mg/cm² was produced by the same procedure as in Comparative Example 3, except that the amount of the carboxymethyl cellulose with a weight-average molecular weight (Mw) of 300,000-490,000 g/mol and a degree of substitution of 0.81-1.0 was used.

Comparative Example 5

An anode having a loading level of 11 mg/cm² was produced by the same procedure as in Comparative Example 3, except that the amount of the carboxymethyl cellulose with a weight-average molecular weight (Mw) of 300,000-490,000 g/mol and a degree of substitution of 1.1-1.2 was used.

Comparative Example 6

An anode having a loading level of 11 mg/cm² was produced by the same procedure as in Comparative Example 3, except that the amount of the carboxymethyl cellulose with a weight-average molecular weight (Mw) of 500,000-700,000 g/mol and a degree of substitution of 0.6-0.89 was used.

Comparative Example 7

An anode having a loading level of 11 mg/cm² was produced by the same procedure as in Comparative Example 3, except that the amount of the carboxymethyl cellulose with a weight-average molecular weight (Mw) of 500,000-700,000 g/mol and a degree of substitution of 0.9-1.0 was used.

Comparative Example 8

An anode having a loading level of 11 mg/cm² was produced by the same procedure as in Comparative Example 3, except that the amount of the carboxymethyl cellulose with a weight-average molecular weight (Mw) of 500,000-700,000 g/mol and a degree of substitution of 1.1-1.2 was used.

Comparative Example 9

An anode having a loading level of 11 mg/cm² was produced by the same procedure as in Comparative Example 3, except that the amount of the carboxymethyl cellulose with a weight-average molecular weight (Mw) of 710,000-1,000,000 g/mol and a degree of substitution of 0.6-0.89 was used.

Comparative Example 10

An anode having a loading level of 11 mg/cm² was produced by the same procedure as in Comparative Example 3, except that the amount of the carboxymethyl celluose with a weight-average molecular weight (Mw) of 710,000-1,000,000 g/mol and a degree of substitution of 0.9-1.0 was used.

Comparative Example 11

An anode having a loading level of 11 mg/cm² was produced by the same procedure as in Comparative Example 3, except that the amount of the carboxymethyl cellulose with a weight-average molecular weight (Mw) of 710,000-1,000,000 g/mol and a degree of substitution of 1.1-1.2 was used.

(Comparative Example 12) 97.7 wt % of an artificial graphite anode active material, 0.8 wt % of carboxymethyl cellulose with a weight-average-molecular weight (Mw) of 300,000-490,000 g/mol and a degree of substitution of 0.6-0.89, and 1.5 wt % of a styrene-butadiene rubber binder were mixed in a water solvent to prepare an anode active material slurry.

The anode active material slurry was coated on a Cu current collector, dried, and compressed to produce an anode having a loading level of 13 mg/cm².

Comparative Example 13

An anode having a loading level of 13 mg/cm² was produced by the same procedure as in Comparative Example 12, except that the amount of the carboxymethyl cellulose with a weight-average molecular weight (Mw) of 300,000-490,000 g/mol and a degree of substitution of 0.9-1.0 was used.

Comparative Example 14

An anode having a loading level of 13 mg/cm² was produced by the same procedure as in Comparative Example 12, except that the amount of the carboxymethyl cellulose with a weight-average molecular weight (Mw) of 300,000-490,000 g/mol and a degree of substitution of 1.1-1.2 was used.

Comparative Example 15

An anode having a loading level of 13 mg/cm² was produced by the same procedure as in Comparative Example 12, except that the amount of the carboxymethyl cellulose with a weight-average molecular weight (Mw) of 500,000-700,000 g/mol and a degree of substitution of 0.6-0.89 was used.

Comparative Example 16

An anode having a loading level of 13 mg/cm² was produced by the same procedure as in Comparative Example 12, except that the amount of the carboxymethyl cellulose with a weight-average molecular weight (Mw) of 500,000-700,000 g/mol and a degree of substitution of 1.1-1.2 was used.

Comparative Example 17

An anode having a loading level of 13 mg/cm² was produced by the same procedure as in Comparative Example 12, except that the amount of the carboxymethyl cellulose with a weight-average-molecular weight (Mw) of 710,000-1,000,000 g/mol and a degree of substitution of 0.6-0.89 was used.

Comparative Example 18

An anode having a loading level of 13 mg/cm² was produced by the same procedure as in Comparative Example 12, except that the amount of the carboxymethyl cellulose with a weight-average molecular weight (Mw) of 710,000-1,000,000 g/mol and a degree of substitution of 0.9-1.0 was used.

Comparative Example 19

An anode having a loading level of 13 mg/cm² was produced by the same procedure as in Comparative Example 12, except that the amount of the carboxymethyl cellulose with a weight-average molecular weight (Mw) of 710,000-1,000,000 g/mol and a degree of substitution of 1.1-1.2 was used.

Measurement of adhesion strength, and crack state

The adhesion strength, the stability of the slurry and the crack state of the anodes according to Comparative Examples 3 to 19 were measured.

The adhesion strength was measured by using a universal testing machine and a method in which an anode active material layer on the Cu current collector was adhered to a polyvinyl chloride (PVC) double-faced tape and the anode was peeled from the current collector at a 180° peel and a speed of 50 mm/min to evaluate the adhesion strength, and the stability of the slurry was determined by allowing it to stand at room temperature (25° C.) for 2 days.

The solubility was determined by coating a carboxymethyl cellulose liquid obtained from dissolution of 1 wt % of carboxymethyl cellulose used in Comparative Examples 3 to 19 in water, on a 5 cm*5 cm OHP (over head projector) film at a thickness of 100 μm to produce a microgel and detecting by eye.

The crack state was measured by coating the negative active material slurry on the current collector and detecting the surface of the active material layer with eyes.

In addition, even though Comparative Example 7 with the loading level of 11 mg/cm² had the weight-average-molecular weight of 500,000 g/mol to 700,000 g/mol and the degree of substitution of 0.9 to 1.0, the adhesion strength was deteriorated and crack was severely occurred so that it can be seen that the effects for suppressing the crack occurrence are not sufficient.

Furthermore, Comparative Examples 9 to 11 and 17 to 19 using high molecular weight carboxymethyl cellulose of the weight-average molecular weight of 710,000 g/mol to 1,000,000 g/mol exhibited severely increased viscosity and crack occurrence.

TABLE 2

|  | Loading level (mg/cm²) | Weight-average molecular weight(Mw, g/mol) | Degree of substitution | Solubility | Adhesion strength | Slurry stability | State of crack |
|---|---|---|---|---|---|---|---|
| Comparative Example 3 | 11 | 300,000-490,000 | 0.6-0.69 | Δ | No measurement, as solubility of CMC was low | | |
| Comparative Example 4 | 11 | 300,000-490,000 | 0.81-1.0 | ◉ | ○ | Δ | ○ |
| Comparative Example 5 | 11 | 300,000-490,000 | 1.1-1.2 | ◉ | Δ | Δ | Δ |
| Comparative Example 6 | 11 | 500,000-700,000 | 0.6-0.89 | X | No measurement, as solubility of CMC was low | | |
| Comparative Example 7 | 11 | 500,000-700,000 | 0.9-1.0 | ◉ | ◉ | ◉ | ◉ |
| Comparative Example 8 | 11 | 500,000-700,000 | 1.1-1.2 | ◉ | Δ | ○ | ○ |
| Comparative Example 9 | 11 | 710,000-1,000,000 | 0.6-0.89 | X | No measurement, as solubility of CMC was low | | |
| Comparative Example 10 | 11 | 710,000-1,000,000 | 0.9-1.0 | Δ | ◉ | Increase in slurry viscosity | ◉ |
| Comparative Example 11 | 11 | 710,000-1,000,000 | 1.1-1.2 | ○ | ○ | Increase in slurry viscosity | ○ |
| Comparative Example 12 | 13 | 300,000-490,000 | 0.6-0.89 | Δ | No measurement, as solubility of CMC was low | | |
| Comparative Example 13 | 13 | 300,000-490,000 | 0.9-1.0 | ◉ | ○ | Δ | X |
| Comparative Example 14 | 13 | 300,000-490,000 | 1.1-1.2 | ◉ | Δ | Δ | X |
| Comparative Example 15 | 13 | 500,000-700,000 | 0.6-0.89 | X | No measurement, as solubility of CMC was low | | |
| Comparative Example 16 | 13 | 500,000-700,000 | 1.1-1.2 | ◉ | Δ | ○ | ○ |
| Comparative Example 17 | 13 | 710,000-1,000,000 | 0.6-0.89 | X | No measurement, as solubility of CMC was low | | |
| Comparative Example 18 | 13 | 710,000-1,000,000 | 0.9-1.0 | Δ | ◉ | Increase in slurry viscosity | ◉ |
| Comparative Example 19 | 13 | 710,000-1,000,000 | 1.1-1.2 | ○ | ○ | Increase in slurry viscosity | ○ |

In Table 2, X indicates very bad, Δ indicates bad, ○ indicates good, ◉ indicates very good, and the detailed information for each of the physical properties are as below.
1) Solubility of CMC
X: No dissolution, Δ: Large amount of non-dissolved gel (50 numbers or more), ○: Presence of non-dissolved gel (less than 50 numbers), ◉: short time for dissolving and no non-dissolved gel
2) Adhesion strength
X: Not detectable, Δ: Less than 0.5 gf/mm, ○: 0.5 gf/mm or more, and less than 1.0 gf/mm, ◉: 1.0 gf/mm or more
3) Slurry stability
X: Immediately formation of precipitation after slurry, Δ: Formation of precipitation within 24 hours, ○: Formation of precipitation between 24 hours to 48 hours, ◉: No formation of precipitation for 48 hours
4) State of crack
X: Total occurrence of crack, Δ: Partial occurrence of crack, ○: Occurrence of crack according to the drying condition, ◉: No occurrence of crack and no separation during a slitting process As shown in Table 2, Comparative Examples 3 to 5, and 12 to 14 using a low molecular weight carboxymethyl cellulose having a weight-average molecular weight of 300,000 g/mol to 490,000 g/mol exhibited occurrence of cracking and deteriorated slurry stability. Furthermore, in case of including the weight-average-molecular weight in the range of 300,000 g/mol to 490,000 g/mol, even if the degree of substitution is included in the range of 0.9-1.0, good solubility of CMC and good adhesion strength were exhibited, but cracking severely occurred, as shown in Comparative Examples 4 and 13.

While this invention has been described in connection with what is presently considered to be practical exemplary embodiments, it is to be understood that the invention is not limited to the disclosed embodiments, and on the contrary, it is intended to cover various modifications and equivalent arrangements included within the spirit and scope of the appended claims.

The invention claimed is:

1. An anode for a lithium secondary battery, comprising a current collector; and an anode active material layer which is formed on one surface of the current collector, and comprises an anode active material, and a cellulose-based compound which has a weight-average molecular weight (Mw) of 500,000 g/mol to 700,000 g/mol and a substitution degree of 0.9 to 1.0, wherein a loading level (L/L) is 13 mg/cm$^2$ or more.

2. The anode for the lithium secondary battery of claim 1, wherein an amount of the cellulose-based compound is 1 wt % or less based on the total weight of the negative active material layer.

3. The anode for the lithium secondary battery of claim 1, wherein an amount of the cellulose-based compound may be 0.6 wt % to 1 wt % based on the total weight of the negative active material layer.

4. The anode for the lithium secondary battery of claim 1, wherein the loading level is 13 mg/cm$^2$ to 15 mg/cm$^2$.

5. The anode for the lithium secondary battery of claim 1, wherein the cellulose-based compound is methyl cellulose, ethyl cellulose, carboxymethyl cellulose, carboxyethyl cellulose, hydroxyethyl cellulose, benzyl cellulose, triethyl cellulose, cyanoethyl cellulose, aminoethyl cellulose, nitro cellulose, cellulose ether, an alkali salt thereof, or a combination thereof.

6. The anode for the lithium secondary battery of claim 1, wherein the negative active material layer further comprises a water-soluble binder.

7. A lithium secondary battery comprising:
an anode of claim 1;
a cathode; and
an electrolyte.

* * * * *